(12) United States Patent
Ross et al.

(10) Patent No.: US 10,795,956 B1
(45) Date of Patent: Oct. 6, 2020

(54) SYSTEM AND METHOD FOR IDENTIFYING POTENTIAL CLIENTS FROM AGGREGATE SOURCES

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 0 days.

(21) Appl. No.: 16/395,161

(22) Filed: Apr. 25, 2019

Related U.S. Application Data

(63) Continuation of application No. 14/576,951, filed on Dec. 19, 2014, now Pat. No. 10,289,738.

(60) Provisional application No. 61/920,119, filed on Dec. 23, 2013.

(51) Int. Cl.
| | |
|---|---|
| G06F 16/00 | (2019.01) |
| G06F 16/9535 | (2019.01) |
| H04M 3/523 | (2006.01) |
| H04M 3/42 | (2006.01) |
| G06Q 30/02 | (2012.01) |

(52) U.S. Cl.
CPC ..... *G06F 16/9535* (2019.01); *G06Q 30/0204* (2013.01); *G06Q 30/0273* (2013.01); *H04M 3/42* (2013.01); *H04M 3/523* (2013.01)

(58) Field of Classification Search
None
See application file for complete search history.

(56) References Cited

U.S. PATENT DOCUMENTS

| | | | |
|---|---|---|---|
| 5,862,223 | A | 1/1999 | Walker et al. |
| 7,072,841 | B1 | 7/2006 | Pednault |
| 8,126,805 | B2 | 2/2012 | Sulkowski et al. |
| 8,484,099 | B1 | 7/2013 | Pope et al. |
| 9,674,364 | B2 * | 6/2017 | Soundar ............ H04M 3/5235 |
| 9,699,309 | B2 | 7/2017 | Spievak et al. |
| 9,979,820 | B2 | 5/2018 | Soundar |
| 2002/0023051 | A1 | 2/2002 | Kunzle et al. |
| 2008/0065569 | A1 | 3/2008 | Dutt et al. |
| 2008/0162256 | A1 | 7/2008 | Moore et al. |
| 2010/0332373 | A1 | 12/2010 | Crabtree et al. |
| 2011/0125783 | A1 | 5/2011 | Whale et al. |
| 2011/0184766 | A1 | 7/2011 | Virdhagriswaran |
| 2011/0258049 | A1 * | 10/2011 | Ramer ............ G06F 17/30867 705/14.66 |

(Continued)

*Primary Examiner* — Gurkanwaljit Singh
(74) *Attorney, Agent, or Firm* — Foley & Lardner LLP (57) ABSTRACT

A method of identifying potential clients from aggregate sources for an insurance company is disclosed. The disclosed method includes an external database, a profile analyzer, and a profile database. A Profile Analyzer is configured to retrieve a set of search results from an external database and may use predictive analytics to extract information from the data retrieved. Further analysis of this data is filtered and may be used to predict trends and consumer behavior patterns. Profile analyzer generates potential client profiles. The client profiles are stored in a profile database operatively coupled with the profile analyzer. Clients profile includes metadata associated with weighted coefficient used for estimating a suitable list of potential clients.

20 Claims, 4 Drawing Sheets

(56) References Cited

U.S. PATENT DOCUMENTS

| | | |
|---|---|---|
| 2011/0307277 A1 | 12/2011 | Cruz et al. |
| 2012/0246139 A1 | 9/2012 | Rao |
| 2013/0159288 A1 | 6/2013 | Nikankin |
| 2015/0039351 A1 | 2/2015 | Bell et al. |
| 2015/0363862 A1 | 12/2015 | Ranft et al. |
| 2016/0212266 A1* | 7/2016 | Soundar .............. H04M 3/5235 |
| 2017/0237856 A1* | 8/2017 | Soundar .................. H04M 3/51 |
| | | 379/265.12 |

* cited by examiner

SYSTEM AND METHOD FOR IDENTIFYING POTENTIAL CLIENTS FROM AGGREGATE SOURCES

CROSS-REFERENCE TO RELATED APPLICATIONS

This application is a continuation of U.S. application Ser. No. 14/576,951, filed Dec. 19, 2014, which claims the benefit of the filing date of U.S. Provisional Application No. 61/920,119, filed Dec. 23, 2013, each of which is incorporated herein by reference in its entirety.

This application relates to U.S. Provisional Application No. 61/920,112, filed Dec. 23, 2013, U.S. Provisional Application No. 61/920,123, filed Dec. 23, 2013, and U.S. Provisional Application No. 61/920,127, filed Dec. 23, 2013, which are hereby incorporated by reference in their entirety.

FIELD OF THE INVENTION

The present disclosure relates in general to systems and methods for identifying potential clients from aggregate sources.

BACKGROUND

Companies may store a variety of types of information related to consumer or customer behavior. In some instances, a company uses this information to promote their services.

The development of communication network technologies enable companies to accumulate more information about potential customers. Given that a consumer performs numerous traceable network interactions over different networks, the amount of information that is accumulated about that particular consumer can be substantial. By analyzing this information, companies can identify potential clients and offer products that meet customer needs. However, the analysis of traceable network interactions may present many challenges due to the large amounts of data and high number of customers.

For the foregoing reasons, there is a need for a system and method that efficiently predicts consumer behavior for assessing insurance needs.

SUMMARY

A system and method for identifying potential clients from aggregate sources and providing valuable insights about consumer behavior and lifestyle tendencies is provided. According to an embodiment, the system described operates in a system architecture that includes a one or more of external sources, an external database, a profile analyzer, and a profile database. In this embodiment, raw data about potential clients is retrieved from one or more external sources and stored in the external database. In this embodiment, raw data about potential clients is retrieved from one or more external sources and stored in the external database. Profile analyzer includes computing equipment suitable for executing algorithms that may be used for executing queries and retrieving required information from external database. Profile analyzer is configured to retrieve a first set of search results from external database and may use predictive analytics to extract information from the data retrieved. Further analysis of this data is filtered and used to predict trends and consumer behavior patterns. Profile analyzer generates potential client profiles. Client's profiles may be stored in profile database operatively coupled with the profile analyzer. Client's profiles include metadata associated with a weighted coefficient used for estimating a suitable list of potential clients. The weighted coefficient combines validation scores for relevant attributes within categories of interest. Validation scores may be also influenced by life events such as marriage, illness or accident, job status, buying a home or a car, child birth, divorce, among others.

In another embodiment, a method for identifying potential clients includes the steps of scanning external sources to look for information useful for identifying potential clients; collecting and storing raw data about potential clients in an external database; filtering raw data obtained from the external database; creating a potential client profile; storing potential client profile in a profile database; computing a weighted coefficient that combines validation scores for relevant attributes within categories of interest for each potential client profile; selecting potential clients; and generating a list of potential clients that may be categorized according to a level of assets and a type of predicted life event.

The system and method disclosed here enables automated selection of potential clients for an insurance company by using a plurality of aggregated sources. Information retrieved and analyzed from these aggregated sources may provide valuable insights about consumer behavior and lifestyle tendencies useful for assessing insurance needs.

In one embodiment, a method comprises generating, by a profile analyzer server, a customer profile comprising a plurality of attributes for each of a plurality of categories of interest; storing, by the profile analyzer server, the generated customer profile in a database; assigning, by the profile analyzer server, a weighting to each attribute in the customer profile based upon a desired potential customer; analyzing, by the profile analyzer server, customer data from a customer data database to determine which customers in the customer data database have at least one attribute that matches at least one attribute in the customer profile; assigning, by the profile analyzer server, a score to each matched attribute in each category of interest for each customer that has at least one matched attribute; and calculating, by the profile analyzer server, a validation score for each category of interest of each customer based on the scores for each matched attribute in that category of interest.

In another embodiment, a method comprises generating, by a profile analyzer server, a customer profile comprising a plurality of attributes for each of a plurality of categories of interest; storing, by the profile analyzer server, the generated customer profile in a database; assigning, by the profile analyzer server, a weighting to each attribute in the customer profile based upon a desired potential customer; analyzing, by the profile analyzer server, customer data from a customer data database to determine which customers in the customer data database have at least one attribute that matches at least one attribute in the customer profile; assigning, by the profile analyzer server, a score to each matched attribute in each category of interest for each customer that has at least one matched attribute; determining, by the profile analyzer server, whether each score for each matched attribute satisfies a threshold amount; and categorizing, by the profile analyzer server, the customers in the customer data database that have at least one matched attribute exceeding the threshold amount to the customer profile, where the customers are categorized based upon an amount of assets and a predicted life event.

Numerous other aspects, features and benefits of the present disclosure may be made apparent from the following detailed description taken together with the drawing.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Potential client" refers to an individual who may require products or services according to personal and financial needs.

"Metadata" refers to analyzed raw data that can be used for creating a potential client profile.

"Predictive analytic" refers to the quantification of data for the identification of relationship patterns between clients or products.

"Validation score" refers to a summation of scores assigned to relevant attributes within a category of interest.

"Attributes" refers to one or more characteristics of a potential client that may be ranked within a category of interest.

"Category of interest" refers to an area of a potential client that may be needed to be evaluated for assessing insurance risk. Examples of category of interest may include financial information, medical profile, consumer habits, and life events, among others.

"Weighted coefficient" refers to the average of validation scores computed for two or more categories of interest, where each category of interest may carry a different amount of importance categories.

Description of the Drawings

System Architecture

Figure 1:
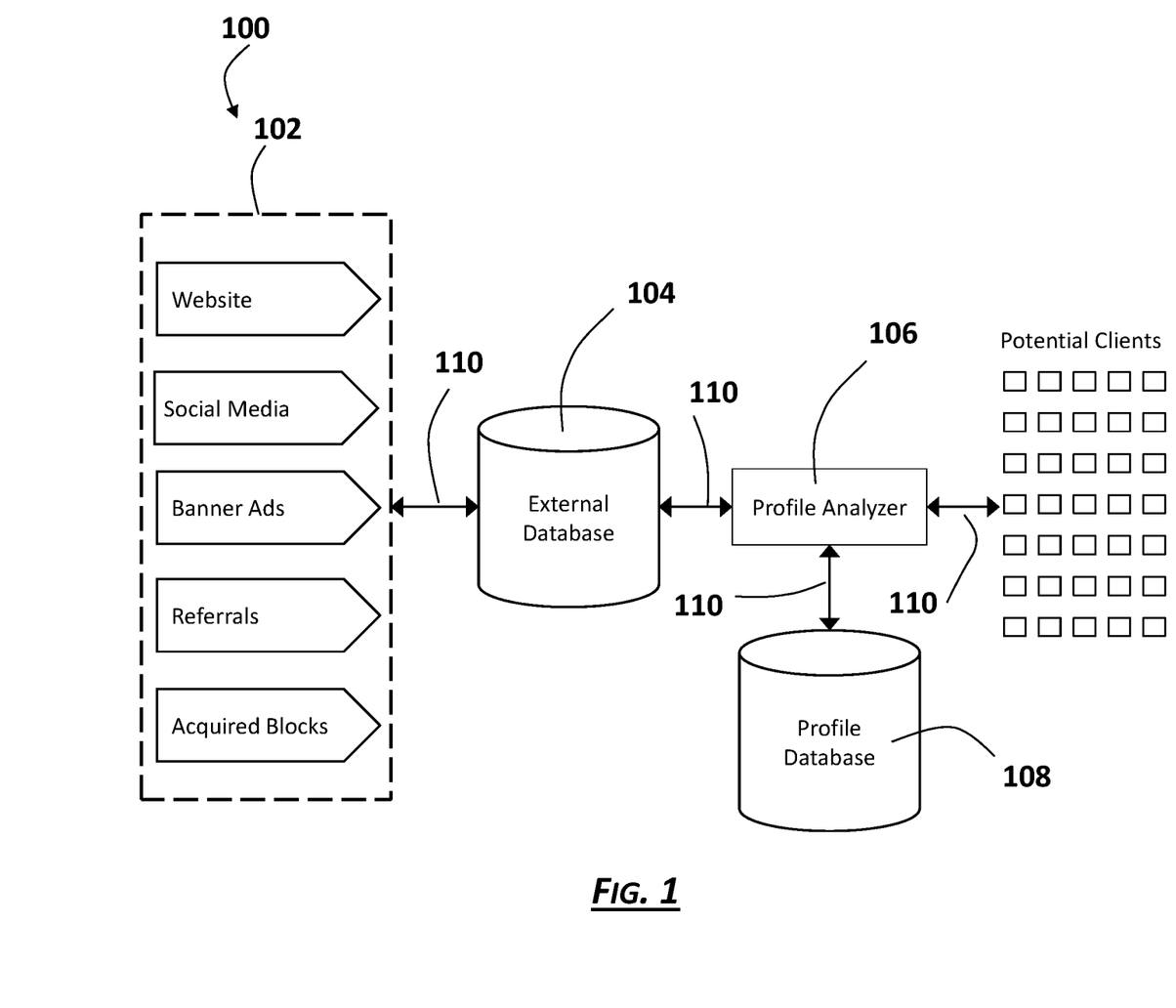
FIG. 1 is an exemplary block diagram of a system architecture for identifying potential clients, according to an embodiment.

FIG. 1 is an exemplary block diagram illustrating a system architecture 100 for identifying potential clients in which one or more embodiments of the present disclosure may operate. In FIG. 1, system architecture 100 includes an external database 104, a profile analyzer 106, and a profile database 108. In another embodiment, system architecture 100 includes additional, fewer, different, or differently arranged components than those illustrated in FIG. 1.

In FIG. 1, profile analyzer 106 is wired/wirelessly coupled to and in wired/wireless communication with external database 104, and profile analyzer 106 is additionally wired/wirelessly coupled to and in wired/wireless communication with profile database 108. In FIG. 1, network connection 110 permits components within system architecture 100 to communicate with each other. Examples of network connections 110 may be intranets, local area networks (LAN), virtual private networks (VPN), wireless area networks (WAN) and the internet among others. The profile analyzer 106 may be a computing device (e.g., server) or a module executed by a processor on a computing device.

In some embodiments, external database 104 retrieved information about potential clients from one or more external sources 102, such as, websites, social media, banner ads, referrals, and acquired blocks among others. In these embodiments, external database 104 is implemented through known in the art database management systems (DBMS) such as, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In another embodiment, profile analyzer 106 may be a set of computer instructions executed by central processing units that run computer executable program instructions or related algorithms. Each central processing unit may be a component of computing devices such as a server, a single computer, or multiple computers in a distributed configuration.

In a further embodiment, profile database 108 stores profiles for each potential client. In these embodiment, profile database 108 may be implemented through known in the art database management systems (DBMS) such as, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In operation, profile analyzer 106 is configured to retrieve a first set of search results from external database 104 and may use predictive analytics to extract information from the data retrieved. Further analysis of this data is filtered and used for predicting trends and consumer behavior patterns. Profile analyzer 106 creates a profile for each potential client and generates a suitable list of potential clients.

In one exemplary embodiment, financial information such as credit cards, assets, and job history, in combination with personal information such as lifestyle, food and entertainment choices may be used for selecting potential clients.

According to some aspects of this embodiment, the system for identifying potential clients collects information of customers and automatically selects potential clients, thereby enabling the expansion of the customer base.

Figure 2:
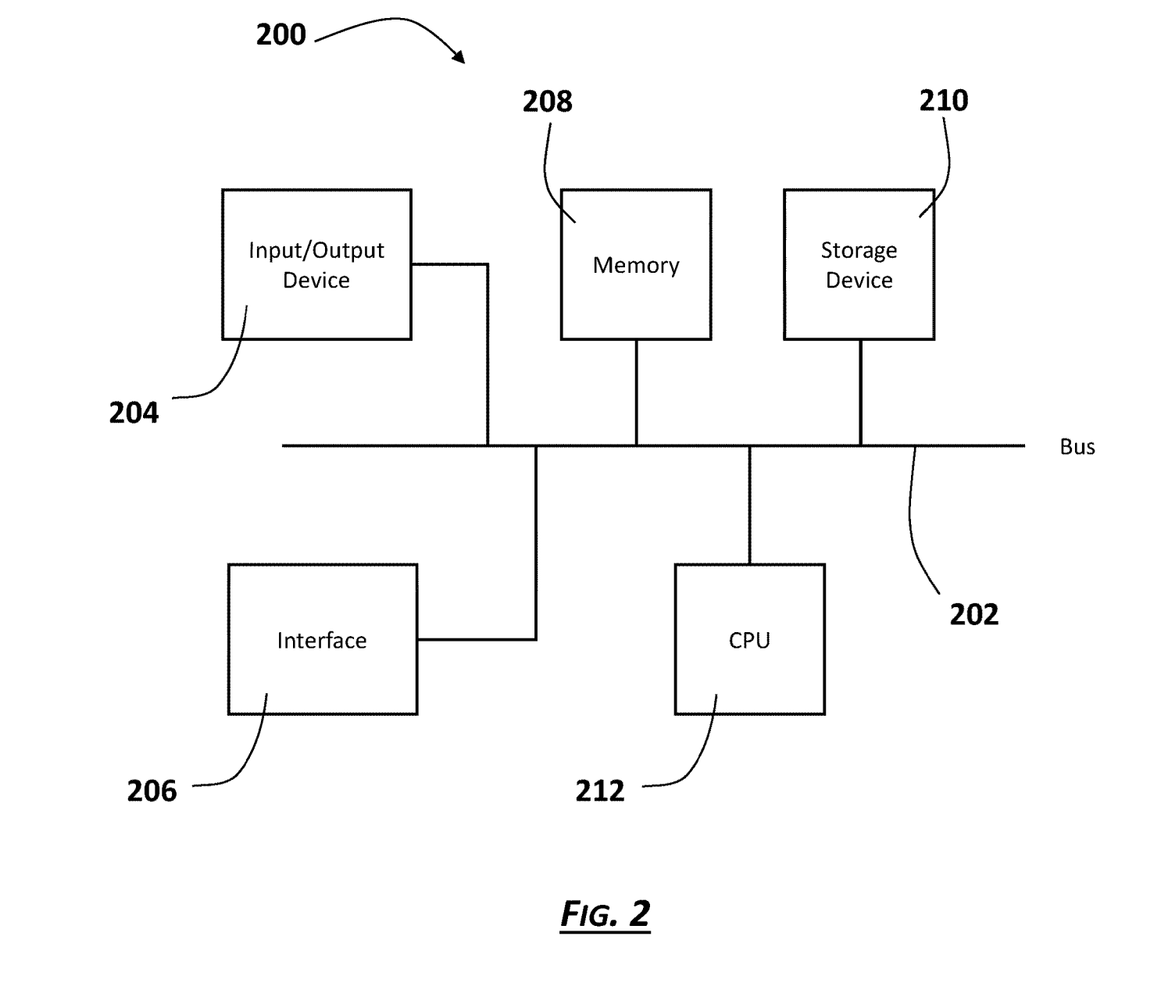
FIG. 2 is an exemplary block diagram of example components of a computing device that may correspond to a server, in which one or more embodiments of the present disclosure may operate.

FIG. 2 is an exemplary computing device 200 in which one or more embodiments of the implementation may operate, according to an embodiment. In one embodiment, computing device 200 includes bus 202, input/output (I/O) device 204, communication interface 206, memory 208, storage device 210, and central processing unit 212. In another embodiment, computing device 200 includes additional, fewer, different, or differently arranged components than those illustrated in FIG. 2.

In FIG. 2, bus 202 is in physical communication with I/O device 204, communication interface 206, memory 208, storage device 210, and central processing unit 212 bus 202 includes a path that permits components within computing device 200 to communicate with each other. Examples of I/O device 204 include peripherals and/or other mechanism that may enable an examiner or candidate to input information to computing device 200, including a keyboard, computer mice, buttons, touch screens, touch-pad, voice recognition, biometric mechanisms, and the like. I/O device 204 also includes a mechanism that outputs information to a user of computing device 200, such as, a display, a microphone, a light emitting diode (LED), a printer, a speaker, orientation sensors and the like. Said orientation sensors include one or more accelerometers, one or more gyroscopes, one or more compasses, and the like.

Examples of communication interface 206 include mechanisms that enable computing device 200 to communicate with other computing devices and/or systems through network connections. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

In one embodiment, the software instructions of the system are read into Memory 208 from another memory location, such as storage device 210, or from another computing device 200 (e.g., first client device, second client device and the like) via communication interface 206. In this embodiment, the software instructions contained within memory 208 cause central processing unit 512 to perform processes that will be described in FIGS. 3 and 4, below.

Figure 3:
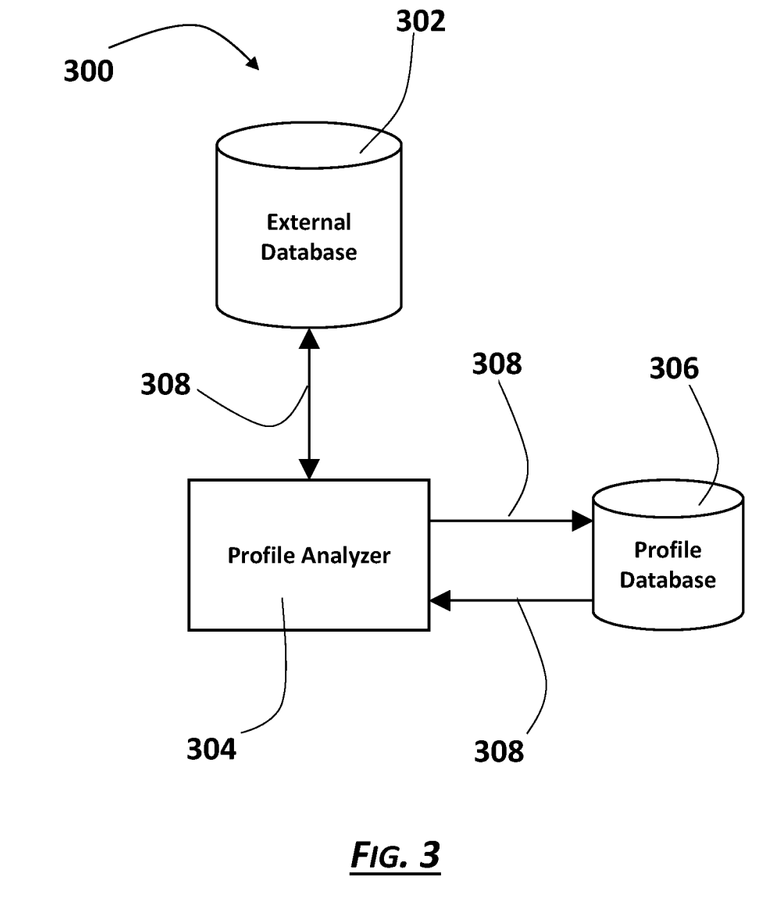
FIG. 3 is an exemplary block diagram of a portion of the system architecture of FIG. 1 for identifying potential clients, according to an embodiment.

FIG. 3 is an exemplary subsystem 300 of a portion of system architecture for identifying potential clients. Subsystem 300 includes an external database 302, a profile analyzer 304, and a profile database 306. It should be understood that block diagram 300 can include less components, more components, or different components depending on the desired analysis goals. In an example and referring to FIG. 1, profile analyzer 304 is implemented as profile analyzer 106 in system architecture 100. In FIG. 3, profile analyzer 304 is operatively coupled to and in communication with external database 302 and profile database 306

In FIG. 3, profile analyzer 304 is wired/wirelessly coupled to and in wired/wireless communication with external database 302, and profile analyzer 304 is additionally wired/wirelessly coupled to and in wired/wireless communication with profile database 306. In FIG. 3, network connection 308 permits components within subsystem 300 to communicate with each other. Examples of network connections 308 may be intranets, local area networks (LAN), virtual private networks (VPN), wireless area networks (WAN) and the Internet among others.

In some embodiments, external database 302 retrieved information about potential clients from one or more external sources, such as, websites, social media, banner ads, referrals, acquired blocks, and databases that store information about a user's online interactions, among others.

According to an embodiment, profile analyzer 304 is implemented as one or more computer software modules that include programmatic rules or logic for executing/running different user interfaces for gathering user data, executing queries, retrieving information, predicting trends, and consumer behavior patterns, and estimating user's preferences. In these embodiments, profile analyzer 304 generates potential client profiles with metadata associated to a weighted coefficient used for estimating a suitable list of potential clients.

In a further embodiment, profile database 306 stores profiles for each potential client. In this embodiment, profile database 306 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In operation, profile analyzer 304 is configured to retrieve a first set of search results from external database 302 and may use predictive analytics to extract information from the data retrieved. Further analysis of this data may be filtered and used for predicting trends and consumer behavior patterns. In these embodiments, profile analyzer 304 generates potential client profiles with metadata associated to a weighted coefficient that is used for estimating a suitable list of potential clients. The weighted coefficient combines validation scores for relevant attributes within categories of interest. Examples of categories of interest may include financial information, consumer habits, medical profiles and life events. Relevant attributes within the financial information category includes income, assets, and debt, among others. Relevant attributes for the consumer habits category includes lifestyle, entertainment preferences, personality and attitude, among others. Relevant attributes for medical profile category includes pre-existing medical conditions, alcohol consumption, tobacco smoking, level of physical exercise, diet, and genetic predisposition, among other. Relevant attributes for the life events category includes marriage, illness or accident, job status, buying a home or car, child birth, divorce, among others. Profile analyzer 304 may assign a numeric score to every relevant attribute within a category of interest, where this numeric value that may vary from 1-5 based on a satisfying set of predetermined criteria. A validation score is calculated for each category of interest. Validation score may be a summation of the scores assigned to relevant attributes within a category of interest. Profile analyzer 304 obtains a weighted coefficient based on the weight of the validation scores calculated from the categories of interest. The weighted coefficient may vary according to logic variables, analog logic, digital inputs and rule based values, among other. According to some aspects of this embodiment, client profiles may be are stored in profile database 306 operatively coupled with profile analyzer 304.

Figure 4:
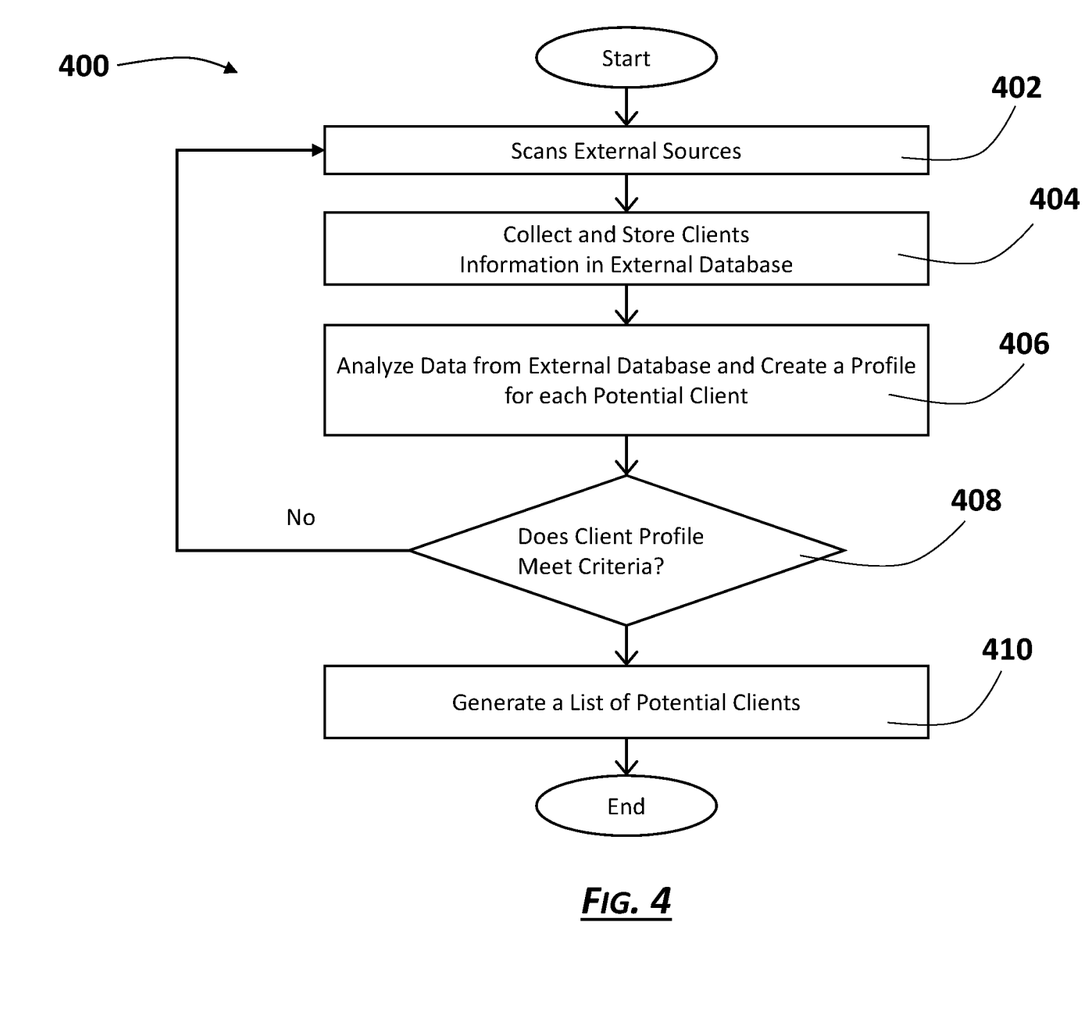
FIG. 4 is an exemplary flowchart of a method for identifying potential clients, according to an embodiment.

FIG. 4 is an exemplary flowchart of a method generally illustrating the generation of a profile for groups of potential clients based on consumer behavior and lifestyle tendencies, among others. A plurality of steps included in method 400 may be performed by one or more computing devices such as computing device 200 of FIG. 2 implementing/running instructions of the software modules described in FIGS. 1 and 3. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 4, method 400 begins at step 402, where a profile analyzer scans one or more external sources to look for useful information for identifying potential clients. In these embodiments, the profile analyzer includes computing equipment suitable for executing algorithms used for executing queries and retrieving required information from external database. According to some aspects of this embodiment, the external sources include websites, social media, banner ads, referrals, and acquired blocks among others. Method 400 advances to step 404.

At step 404, the profile analyzer collects and stores raw data about potential clients in an external database. In these embodiments, the external database may be implemented through known in the art database management systems (DBMS) such as, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. According to some aspects of this embodiment, the raw data that is stored in the external database includes identity, age, ethnicity, place of residence, number and identity of dependent persons (e.g., children, dependent adults), expenditure, savings, approximate market value of assets and their composition, education, professional situation, shopping and travel preferences, hobbies, social activities, lifestyle, and online behavioral patterns, among others. Method 400 advances to step 406.

At step 406, the profile analyzer continues with the analysis of the raw data for the creation of client profiles, more specifically, the profile analyzer filters raw data to obtain and store information about potential clients' financial status and lifestyle, which may be useful for predicting life events. In this embodiment, the client profiles may be stored in a profile database operatively coupled to the profile analyzer. Method 400 advances to step 408.

At step 408, the profile analyzer computes a weighted coefficient that combines validation scores for relevant attributes within categories of interest for each client profile. In these embodiments, the profile analyzer generates potential client profiles using metadata associated with a weighted coefficient that may be used for estimating a suitable list of potential clients.

According to some aspects of this embodiment, the profile analyzer may assign a numeric score (e.g., a rating from 1 to 5) to every relevant attribute within a category of interest based on a satisfying set of predetermined criteria. In a further embodiment, a validation score is calculated for each category of interest. In this embodiment, the validation score is a summation of the scores assigned to relevant attributes within a category of interest. Then, profile analyzer obtains a weighted coefficient based on the weight of the validation scores calculated from the categories of interest. Finally, if the weighted coefficient computed for the client profiles do not meet a predefined threshold, the profile analyzer continues scanning raw data from the external database for creating new client profiles and for updating client profiles already stored in the profile database. Method 400 advances to step 410.

Otherwise, at step 410, the client profiles that satisfy the predefined threshold is added to a list of potential clients. In one embodiment, the generated list of potential clients is categorized according to the level of assets, and the type of predicted life event. Once all client profiles that satisfy the predefined threshold are added to the list of potential clients, method 400 ends.

By executing method 400 through the exemplary operating environments shown in FIGS. 1-4, big data analytics and data mining techniques can be implement for a more efficient and faster processing of larger data sets. In this way, efficiencies are created by providing the financial or insurance company with ways to automatically select potential clients. In addition, provides valuable insights about consumer behavior and lifestyle tendencies useful for assessing insurance needs. These features allow performing large work such as heavy calculations and time consuming analysis in a more efficient manner than other approaches such as manual work performed by humans.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, engines, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A server-implemented method comprising:
generating, by a server, an interactive electronic message for each potential customer using information associated with a social media profile of each potential customer, the interactive electronic message comprising one or more graphical input elements configured to receive an electronic response from each potential customer, the social media profile of each potential customer comprising a plurality of attributes, wherein the server periodically scans one or more social media websites to retrieve the information associated with each potential customer;
responsive to receiving an indication that at least one potential customer has interacted with at least one graphical input element of the interactive electronic message, updating, by the server, the plurality of attributes associated with the social media profile of each potential customer based on the electronic response received from each potential customer;
executing, by the server, an artificial intelligence model having a forecasting algorithm using the plurality of attributes associated with the social media profile of each potential customer to identify one or more potential customers having a life event, each of the one or more potential customers having at least one attribute that matches an attribute in a customer profile of at least one existing customer;
generating, by the server, a weighted coefficient associated with a forecasted life event for each of the one or more potential customers based on a summation of a weight score value of each attribute in the social media profile of each potential customer that matches with the attribute in the customer profile of the at least one existing customer;
determining, by the server, a subset of potential customers from the one or more potential customers having the weighted coefficient greater than a predetermined threshold;
determining, by the server, a new product corresponding to the forecasted life event of each of the subset of potential customers; and
presenting, by the server, the new product on a user interface of a computing device of each of the subset of potential customers.

2. The server-implemented method according to claim 1, further comprising generating, by the server, over a communication network, metadata corresponding to the plurality of potential customers derived from scanning of social media networking sources associated with the plurality of potential customers, the metadata comprising the plurality of attributes for each category of interest.

3. The server-implemented method according to claim 2, further comprising generating, by the server, the social media profile of each of the plurality of potential customers based on processing of information within the metadata.

4. The server-implemented method according to claim 2, wherein each category of interest is selected from a group consisting of financial information, consumer habits, medical profiles, and life events.

5. The server-implemented method according to claim 1, further comprising transmitting, by the server, the interactive electronic message to the computing device of each of the plurality of potential customers.

6. The server-implemented method according to claim 5, further comprising receiving, by the server, the electronic response corresponding to the one or more graphical input elements from the computing device of each of the plurality of potential customers.

7. The server-implemented method according to claim 1, further comprising generating, by the server, an updated plurality of attributes associated with the social media profile of each potential customer based on the electronic response corresponding to the one or more graphical input elements.

8. The server-implemented method according to claim 1, wherein each of the plurality of attributes is selected from a group consisting of income, assets, and debt.

9. The server-implemented method according to claim 1, further comprising varying, by the server, the weighted coefficient associated with the social media profile of each of the one or more potential customers according to one or more logic variables and an analogic logic value.

10. The server-implemented method according to claim 1, further comprising generating, by the server, metadata corresponding to the plurality of potential customers from evaluating behavior patterns and estimating preferences associated with each of the plurality of potential customers.

11. A system comprising:
a server configured to:
generate an interactive electronic message for each potential customer using information associated with a social media profile of each potential customer, the interactive electronic message comprising one or more graphical input elements configured to receive an electronic response from each potential customer, the social media profile of each potential customer comprising a plurality of attributes, wherein the server periodically scans one or more social media websites to retrieve the information associated with each potential customer;
responsive to receiving an indication that at least one potential customer has interacted with at least one graphical input element of the interactive electronic message, update the plurality of attributes associated with the social media profile of each potential customer based on the electronic response corresponding to the one or more graphical input elements;
execute an artificial intelligence model having a forecasting algorithm using the plurality of attributes associated with the social media profile of each potential customer to identify one or more potential customers having a life event, each of the one or more potential customers have at least one attribute that matches an attribute in a customer profile of at least one existing customer;
generate a weighted coefficient associated with forecasted life event for each of the one or more potential customers based on a summation of a weight score value of each attribute in the social media profile of each potential customer that matches with the attribute in the customer profile of the at least one existing customer;
determine a subset of potential customers from the one or more potential customers having the weighted coefficient greater than a predetermined threshold;
determine a new product corresponding to the forecasted life event of each of the subset of potential customers; and
present the new product on a user interface of a computing device of each of the subset of potential customers.

12. The system according to claim 11, wherein the server is further configured to generate over a communication network, metadata corresponding to the plurality of potential customers derived from scanning of social media networking sources associated with the plurality of potential customers, the metadata comprising the plurality of attributes for each category of interest.

13. The system according to claim 12, wherein the server is further configured to generate the social media profile of each of the plurality of potential customers based on processing of information within the metadata.

14. The system according to claim 12, wherein each category of interest is selected from a group consisting of financial information, consumer habits, medical profiles, and life events.

15. The system according to claim 11, wherein the server is further configured to transmit the interactive electronic message to the computing device of each of the plurality of potential customers.

16. The system according to claim 15, wherein the server is further configured to receive the electronic response corresponding to the one or more graphical input elements from the computing device of each of the plurality of potential customers.

17. The system according to claim 11, wherein the server is further configured to generate an updated plurality of attributes associated with the social media profile of each potential customer based on the electronic response corresponding to the one or more graphical input elements.

18. The system according to claim 11, wherein each of the plurality of attributes is selected from a group consisting of income, assets, and debt.

19. The system according to claim 11, wherein the server is further configured to vary the weighted coefficient associated with the social media profile of each of the one or more potential customers according to one or more logic variables and an analogic logic value.

20. The system according to claim 11, wherein the server is further configured to generate metadata corresponding to the plurality of potential customers from evaluating behavior patterns and estimating preferences associated with each of the plurality of potential customers.

* * * * *